United States Patent [19]
Dahlgren

[11] 3,801,360
[45] Apr. 2, 1974

[54] METHOD FOR CONTROLLING THE LEVEL OF THE PRESSURE IN THE LOW PRESSURE PHASE OF AN OSCILLATING PRESSURE IMPREGNATING PROCESS

[75] Inventor: Sven-Eric Dahlgren, Landskrona, Sweden

[73] Assignee: Boliden Aktiebolag, Stockholm, Sweden

[22] Filed: Oct. 20, 1971

[21] Appl. No.: 190,886

[30] Foreign Application Priority Data
Oct. 22, 1970 Sweden.............................. 14277/70

[52] U.S. Cl.......................... 117/116, 21/7, 21/65, 117/DIG. 2, 117/59, 117/119, 118/7, 118/50
[51] Int. Cl........................... B05c 3/00, B44d 1/26
[58] Field of Search............... 117/61, 59, 116, 119; 21/7, 65; 118/7, 50

[56] References Cited
UNITED STATES PATENTS

| | | | |
|---|---|---|---|
| 2,786,784 | 3/1957 | Henriksson | 117/119 X |
| 1,374,362 | 4/1921 | Davis et al. | 117/61 |
| 688,932 | 12/1901 | Chanute | 117/116 |
| 3,677,805 | 7/1972 | Barnett | 117/116 X |
| 3,671,299 | 6/1972 | Barnett | 117/116 X |
| 231,784 | 8/1880 | Flad | 117/119 X |
| 2,931,737 | 4/1960 | Leeds | 117/119 X |
| 709,799 | 9/1902 | Ruping | 117/61 X |

FOREIGN PATENTS OR APPLICATIONS
1,203,299   8/1970   Great Britain........................ 117/59

OTHER PUBLICATIONS
Murrill; Automatic Control of Processes, 1967, International Textbook Company; pages 4, 5, 6, 140, 141, 142, 143, 341.

*Primary Examiner*—Murray Katz
*Assistant Examiner*—Shrive P. Beck

[57] ABSTRACT

A method in the impregnation of wood, and other material liable to boideterioration, when applying the oscillating pressure principle, in which the preservative solution and the material are subjected to alternating phases of high and low pressure and in which, during the low pressure phase, the preservative solution is drawn from a source of such solution to the treatment vessel and through said vessel while controlling the flow of solution thereto in a manner to maintain a set point pressure in said vessel which conforms with a predetermined pressure pattern.

4 Claims, 1 Drawing Figure

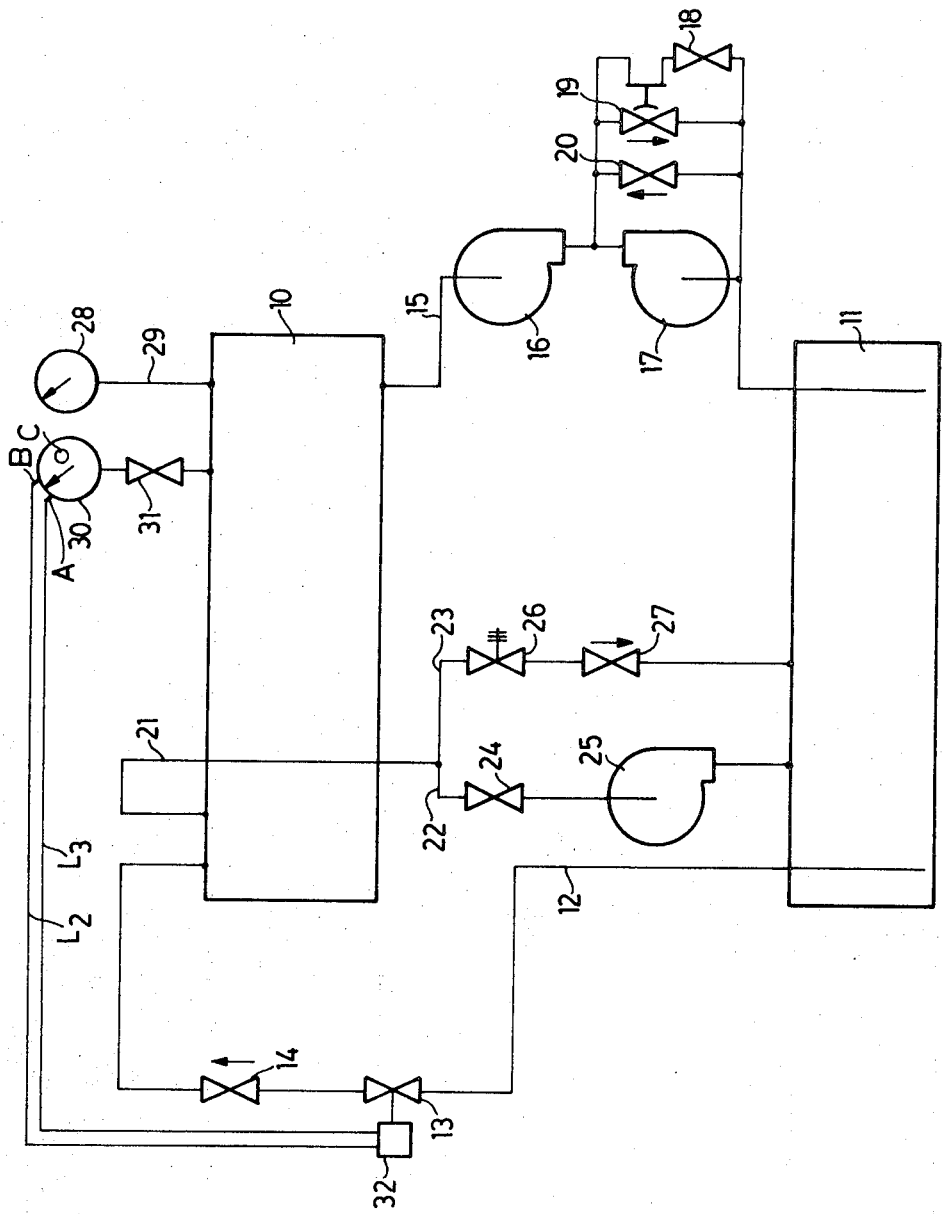

METHOD FOR CONTROLLING THE LEVEL OF THE PRESSURE IN THE LOW PRESSURE PHASE OF AN OSCILLATING PRESSURE IMPREGNATING PROCESS

The present invention relates to the impregnation of wood and other materials exposed to biodeterioration by means of the oscillating pressure principle, according to which the preservative solution and the material being treated are subjected to alternating phases of high and low pressure. More specifically the invention relates to a method for controlling the level of the pressure in a treatment vessel during the low pressure phases.

In British Pat. No. 727,041 there is described a method for impregnating wood in accordance with the oscillating pressure principle, whereby normally a constant maximum pressure is applied during the high pressure phase and a constant maximum vacuum relative to atmospheric is maintained during the low pressure phase. The British Pat. No. 1,203,299 discloses the advantage to be gained by decreasing progressively the level of absolute pressure during the low pressure phases to a minimum value. The British patent also discloses apparatus for controlling the pressure during the low pressure phases. This apparatus, however, is complicated, both with respect to operation and design.

One object of the present invention is to provide a method by means of which the level of the pressure in the treatment vessel can be controlled during the low pressure phases in accordance with a new principle which is simple to put into effect and which affords important advantages from the aspect of impregnating material with a preservative.

The present invention is based on the concept that the pressure on the suction side of a suction device, e.g., a centrifugal pump, provided with a free outlet, is determined by the rate of flow through the device. Accordingly the method of the invention for controlling the pressure level during the low pressure phases is mainly characterized by the steps of, during the low pressure phases, drawing preservative solution from a storage tank to the treatment vessel and through said vessel while controlling the flow of said solution thereto in a manner to control the pressure therein according to a predetermined pressure pattern favorable to the material being treated and passing the solution back to the storage tank. The flow of solution around the system during the low pressure phase is suitably effected by a suction pump, whereby the pressure in the treatment vessel adopts a value which corresponds to the characteristic of the suction pump and to the regulated flow of solution from the storage tank to the treatment vessel. The term "pump characteristic" as used here implies the volumetric capacity of the pump as a function of the inlet pressure. An important advantage afforded by the method of the present invention and not obtained with methods known to the prior art resides in the fact that during the low pressure phases the preservative solution flows through the treatment vessel and flushes around the material undergoing treatment. The intensity with which the preservative solution flows around the material in the vessel increases with decreasing under-pressure relative to atmospheric. Such flushing of the preservative solution decreases the risk of sap or the like located close to the surface of the material undergoing treatment from being forced back into the wood during the subsequent high pressure phase, thereby providing for a more effective penetration of the preservative solution into the material. Thus, the tendency for untreated zones to occur, which has been a serious inconvenience with methods previously applied in the art, is counteracted when applying the method of the present invention.

For the purpose of controlling the pressure level during the low pressure phases, the pressure in the treatment vessel is sensed and compared with a desired pressure level, which is determined by the type of material being treated. Any difference in pressure may be converted to a control signal which is used to actuate a valve for controlling the flow of preservative solution to the vessel and placed in a conduit for ducting preservative solution from the storage tank to the treatment vessel during the low pressure phases. Depending on the type of material to be impregnated and its condition at the beginning of the impregnating process, it may be to advantage to vary the desired pressure value with each low pressure phase or groups of phases in accordance with a pattern favourable to the material. For example, in a manner whereby the pressure level during one low pressure phase is initially very low and is thereafter progressively increased throughout the succeeding low pressure phases. Other forms of variation in the pressure level during the low pressure phase, however, can also be applied to advantage. Moreover, it also lies within the concept of the present invention to vary the desired pressure level during an individual low pressure phase or groups of such phases. It will be readily perceived that variation of the desired pressure level, or set point pressure, during the low pressure phases can be effected either manually or by a program control means of known type.

Flushing of preservative solution around the material undergoing treatment can be improved by causing the preservative solution to flow through the container in a manner such that substantially all the material to be impregnated is passed over by the solution. This can be accomplished by causing the preservative solution to flow "diagonally" through the treatment vessel, i.e., from the top of one side of the vessel to the bottom of the other.

Also disclosed is a system for putting the above method into effect, said system being mainly characterized by storage means for preservative solution, a first conduit for ducting preservative solution from the storage tank to the treatment vessel, a second conduit for returning the preservative solution from said vessel to said tank, suction means arranged in the second conduit between the treatment vessel and the storage tank, and adjustable means located in the first conduit for controlling the flow of solution from the storage tank to the treatment vessel to control the pressure in said tank according to a predetermined pressure pattern, the pressure in the treatment vessel thereby taking a value corresponding to the characteristic of the pump and to the flow of preservative solution in the conduit.

As mentioned in the aforegoing, when applying the oscillating pressure principle the pressure in the impregnating container is normally alternated around atmospheric pressure so that when operating on the low pressure phases the pressure in the treatment vessel is below atmospheric. In certain instances, however, it is to advantage to pre-treat the material with compressed air, whereupon the pressure of the air within the material, e.g., within the wood cells, will be above atmospheric. Consequently, in this case the level of the pressure in the treatment vessel during the low pressure phase can be set to a value equal to the pressure of the air within the material and therefore higher than atmospheric pressure. The term "atmospheric pressure" as used hereinafter is therefore also meant to include the higher pressure obtained in the material as a result of its pre-treatment with compressed air. The pressure level in the treatment vessel towards minimum values is restricted by the vapour pressure of the preservative solution at the prevailing treatment temperature or temperatures.

The invention will now be described in more detail with reference to the accompanying drawing, which illustrates diagrammatically an oscillating pressure impregnating system for putting the method of the present invention into practice. For the sake of clarity, the electronic, hydraulic and pneumatic devices used in the control system have been omitted in the drawing.

The exemplary system for impregnating wood and other materials exposed to biodeterioration according to the method of the present invention includes a treatment vessel 10 and a storage tank 11 for preservative solution. The preservative solution during a low pressure phase is ducted from the storage tank 11 to the treatment vessel 10 through a first conduit 12, i.e., the low-pressure line, in which are connected a control valve 13 and a one-way valve 14, the setting of the control valve 13 being regulated by a servo motor 32.

As will be seen from the drawing, the storage tank 11 also communicates with the treatment vessel 10 through a supply and return conduit 15, in which are connected a suction pump 16 and a pressure pump 17. Installed in their respective ones of three lines connected in parallel to the pressure pump 17 is a pressure-operated one-way valve 19 a pilot-type solenoid valve 18 capable of actuating the valve 19, and a further one-way valve 20, these valves being operative in controlling the flow of preservative solution to and fro between the storage tank 11 and the treatment vessel 10 in a manner to be hereinafter described.

To provide, among other things, for the removal from the treatment vessel of air extracted from the material and entrapped in the vessel, there is arranged between the treatment vessel 10 and the storage tank 11 a further conduit 21, which is divided into two branch lines 22 and 23. Arranged in the branch line 22 is a solenoid valve 24 and a vacuum pump 25, while arranged in the branch line 23 is a safety valve 26 and a one-way valve 27.

As illustrated in the drawing, the exemplary apparatus of the present invention is provided with a switch manometer 28, which is arranged to cooperate in a known manner with switch means which prevent activation of the pump 25 and opening of the valves 18, 24, 31 (and also delays starting of pump 17) until the pressure in the treatment vessel reaches a predetermined level set on the manometer, normally in the region of atmospheric, and which is connected to the treatment vessel 10 through a line 29 in a manner to be in constant communication with the vessel. The system is also provided with a low-pressure meter or vacuometer 30 connected to the treatment vessel via a switchable valve 31.

The operation of the system is controlled by known control means capable of being programmed for adjusting the time taken to pass from the termination of the high pressure period to the termination of the low pressure period and vice versa. By termination of the high and low pressure period is meant here respectively the point at which the maximum pressure prevailing during the high pressure phase begins to fall towards the set point pressure of the low pressure phase and the point at which this pressure begins to rise again towards said maximum pressure.

In the following, a brief description will be given of the operation of the illustrated system during the high pressure phases, while the operation of the system during the low pressure phases will be given in greater detail, the mode of control of the control means being described in conjunction therewith.

When operating on the high pressure phase, the three solenoid valves 18, 24 and 31 are closed. Preservative solution is pumped by the pressure pump 17 from the storage tank 11 to the treatment vessel 10 until the desired pressure is obtained therein, this pressure being the maximum pressure which the pump 17 is capable of delivering. Alternatively, if a pressure is desired in the vessel which is lower than the maximum pump pressure, the valve 26 can be adjusted to permit a determined flow of liquid from the vessel 10 to pass through the valve, thereby obtaining the desired pressure, the valve 26 being actuated manually or by the aforementioned control means not shown. The safety valve 26 also constitutes a drain for excessive preservative solution in the treatment vessel, which surplus solution is returned to the storage tank via the one-way valve 27. The one-way valve 14 is adapted to prevent flow of liquid from the treatment vesel 10 to the storage tank 11 through the first conduit 12, and the valve 31 prevents the vacuometer from being subjected to the high pressure prevailing during the high pressure phase.

At the termination of a high pressure period, the pressure pump 17 is switched off and the suction pump 16 is switched on by the control means (not shown). Simultaneously herewith the control means instructs the switch means cooperating with the manometer 28 to activate the pump 25 and to open the valves 31, 24 and 18, when the pressure in the treatment vessel reaches the level set on the manometer 28. When the pilot-type solenoid valve 18 is opened subsequent to this pressure being reached, a small stream of solution will pass therethrough to the tank 11 and the pressure on the pressure-operated one-way valve 19, which may be controlled by means of a diaphragm for example, will fall so that preservative solution drawn from the treatment vessel is able to flow through the suction pump 16 and the valve 19 to the storage tank 11. At the same time the vacuum pump 25 will begin to remove extracted gas or air from the treatment vessel 10 through the lines 21 and 22 and the solenoid valve 24. Minor quantities of preservative solution can also flow back to the storage tank through said lines 21, 22 and the valve 24. Subsequent to the aforementioned activation of the mentioned system components, the pressure in the treatment vessel 10 will fall to a predetermined pressure level determined by the characteristic of pump 16 and the setting on valve 13.

As the solenoid valve 31 opens, the switch vacuometer 30 becomes operative and senses the pressure in the treatment vessel 10. As will be seen from the drawing the switch vacuometer is connected to the servo motor 32 via two lines $L_2$ and $L_3$ extending from contacts A and B. The arrangement of the vacuometer and servo motor is such that when the needle of the vacuometer 30 takes a position corresponding to contact A, as a result of the pressure prevailing in the treatment vessel, a signal is sent through line $L_3$ instructing the servo motor 32 to adjust the setting of valve 13 to allow a higher rate of flow therethrough. Conversely, if the pressure in the vessel 10 is of such magnitude that the needle takes a position corresonding to the position of contact B, a signal is sent along line $L_2$ instructing the servo motor to regulate valve 13 until the pressure in the vessel corresponds to a set point pressure pre-set on the vacuometer 30, this pressure being represented by the position of the needle between contacts A and B, at which position the valve 13 is unactivated and retains the setting last made by the servo motor 32. The set point for the switch vacuometer 30 may be adjusted manually, as by the knob C for example, or may be program controlled, e.g., by means of a known camming arrangement of the like adapted to actuate the switch. In this latter instance, the servo motor 32 is suitably in the form of an electric motor. The signals from the switch vacuometer 30, however, can also be sent hydraulically or pneumatically, in which case the servo motor 32 is driven accordingly.

By means of the set point on the switch vacuometer 30, it is possible to vary the desired low pressure level in the treatment vessel 10 in succeeding low pressure phases according to a pre-determined pattern, e.g., in the manner described in British Pat. No. 1,203,299, although as before mentioned the pressure desired in the treatment vessel 10 can also be varied during the actual low pressure phases themselves, for example the pressure during the initial portion of a low pressure phase can be set at a relatively low level and caused to increase gradually towards atmospheric.

As is well known, valves working with servo motors are relatively sluggish and take considerable time to move between the open and closed positions. Consequently, when operating on the high pressure phase, the servo motor 32 is suitably isolated, e.g., by means of the mentioned programable control means (not shown). Thus, in this way, the setting of the control valve 13 obtained at the end of one low pressure phase will be maintained during the subsequent high pressure phase, thereby enabling the pressure level to be adjusted more rapidly during the succeeding low pressure phase. Of course, if rapid operating valves are used, this measure is not necessary.

Moreover, when switching from the low pressure phase to the high pressure phase, it is desirable to replenish the solution in the treatment vessel as quickly as possible, and thus raise the pressure in the vessel. However, if the pump 17 were to be made operative immediately upon stopping the pump 16, the shock experienced by the pump 17 upon starting would be highly detrimental thereto. In order to provide for a suitable delay between stopping the pump 16 and starting the pump 17, the control means (not shown) is programed to send a signal to the switch means cooperating with the manometer 28 at the termination of the low pressure period, instructing the switch to start the pump 17, when the aforementioned predetermined set pressure on the manometer 28 is reached. During this waiting period preservative solution will flow through the valve 20 in a direction opposite to the flow through the pressure-operated one-way valve 19 under the influence of the vacuum prevailing in the treatment vessel at the switch-over point from the low pressure phase to the high pressure phase, thereby enabling solution to pass to the vessel substantially immediately the pump 16 is stopped and enabling the mentioned short delay to be employed before starting up the pump 17 without disturbing the continuity of the system.

Although the aforementioned mode of operation of the system will provide for substantially constant flow of preservative solution through the treatment vessel 10 during the low pressure phase, this through flow of solution can be improved by connecting for instance, the conduit 12 to the upper portion of the treatment vessel 10 at one end thereof and the conduit 15 to the lower portion of the vessel at the other end thereof. Thus, at the commencement of a high pressure phase the treatment vessel is at least partially filled with preservative solution, thereby enabling a more rapid build up of pressure during the high pressure phase.

Although the invention has been described and illustrated with reference to a particular embodiment thereof, it will be understood that modifications are possible within the purview of the invention. Thus, although the suction pump 16 has been illustrated and described as a centrifugal pump, other appropriate pumps may also be used. Furthermore, as will be obvious from the aforegoing, the adjustable system components, such as valve 13 and 26, servo motor 32, manometers 28 and 30 etc., can be manually operated. However, it will readily be understood that all such components can be controlled and supervised by appropriate programmable control systems of any known type. Such control systems do not form part of the invention per se and are obvious to those skilled in this art. Consequently, no detailed description has been given of the control means applied in the subject example.

What is claimed is:

1. A method for the impregnation of wood, and other material exposed to biodeterioration, by means of the oscillating pressure principle in which the preservative solution and the material being treated are subjected to alternating phases of high and low pressure in accordance with a predetermined pressure pattern, said method comprising during the low pressure phases, continuously drawing preservative solution from a solution storage tank to the treatment vessel and through and out of said vessel by applying a suction force to the preservative solution from a point located on the downstream side of said vessel and controlling the pressure in the vessel according to said predetermined pressure pattern by controlling the flow of said solution to said vessel so as to cause substantially all the material therein to be effectively flushed by the solution during its passage therethrough.

2. A method according to claim 1, characterized by the steps of sensing the pressure in the treatment vessel during the low pressure phases, comparing said sensed pressure with a desired pressure value, and utilizing observed and recorded differences in said pressures to actuate means for controlling the flow of preservative solution from the storage tank to the treatment vessel during said low pressure phases.

3. A method according to claim 2, characterized by varying the desired pressure value during each low pressure phase.

4. A method according to claim 2, characterized by varying the desired pressure valve between sequential low pressure phases.

* * * * *